US008055553B1

(12) United States Patent
Roy et al.

(10) Patent No.: US 8,055,553 B1
(45) Date of Patent: Nov. 8, 2011

(54) DYNAMIC COMPARISON TEXT FUNCTIONALITY

(75) Inventors: Scott E. Roy, Rowlett, TX (US); Timothy Gar Wai Ho, Arlington, MA (US); Hannah Y. Moon, Boston, MA (US)

(73) Assignee: Verizon Laboratories Inc., Waltham, MA (US)

( * ) Notice: Subject to any disclaimer, the term of this patent is extended or adjusted under 35 U.S.C. 154(b) by 1361 days.

(21) Appl. No.: 11/334,543

(22) Filed: Jan. 19, 2006

(51) Int. Cl.
*G06F 17/30* (2006.01)
(52) U.S. Cl. ...................................... 705/27.1
(58) Field of Classification Search .................. 705/26, 705/27, 27.1, 26.1
See application file for complete search history.

(56) References Cited

U.S. PATENT DOCUMENTS

| | | | |
|---|---|---|---|
| 4,532,554 A | 7/1985 | Skala | |
| 4,546,382 A | 10/1985 | McKenna et al. | |
| 4,602,279 A | 7/1986 | Freeman | |
| 4,789,235 A | 12/1988 | Borah et al. | |
| 4,850,007 A | 7/1989 | Marino et al. | |
| 4,992,940 A | 2/1991 | Dworkin | |
| 5,144,663 A | 9/1992 | Kudelski | |
| 5,155,591 A | 10/1992 | Wachob | |
| 5,162,989 A | 11/1992 | Matsuda | |
| 5,187,735 A | 2/1993 | Herrero Garcia et al. | |
| 5,220,501 A | 6/1993 | Lawlor et al. | |
| 5,231,494 A | 7/1993 | Wachob | |
| 5,237,157 A | 8/1993 | Kaplan | |
| 5,267,171 A | 11/1993 | Suzuki | |
| 5,283,731 A | 2/1994 | Lalonde et al. | |
| 5,305,195 A | 4/1994 | Murphy | |
| 5,319,455 A | 6/1994 | Hoarty | |
| 5,339,239 A | 8/1994 | Manabe | |
| 5,347,632 A | 9/1994 | Filepp | |
| 5,359,508 A | 10/1994 | Rossides | |
| 5,408,417 A | 4/1995 | Wilder | |
| 5,410,344 A | 4/1995 | Graves | |
| 5,446,919 A | 8/1995 | Wilkins | |
| 5,479,491 A | 12/1995 | Herrero Garcia et al. | |
| 5,502,636 A | 3/1996 | Clarke | |
| 5,515,098 A | 5/1996 | Carles | |
| 5,532,735 A | 7/1996 | Blahut et al. | |
| 5,636,346 A | 6/1997 | Saxe | |
| 5,659,732 A | 8/1997 | Kirsch | |
| 5,664,109 A | 9/1997 | Johnson et al. | |
| 5,704,060 A | 12/1997 | Del Monte | |
| 5,704,560 A | 1/1998 | Wimmer | |

(Continued)

FOREIGN PATENT DOCUMENTS

JP 2003233684 8/2003

(Continued)

OTHER PUBLICATIONS

Undated ebay search printout (showing 33 items found).

(Continued)

*Primary Examiner* — Mark Fadok

(57) ABSTRACT

A system is provided comprising a plurality of listings, a plurality of labels associated with at least some of the listings. Additionally, a plurality of form inputs are provided, each associated with one of the labels, wherein selection of a form input causes a transition of the associated label from a first state to a second state. The system further includes a link that is made active upon the transition, thereby associating an action with a label wherein a first description is displayed in the first state and a second description is displayed in the second state.

20 Claims, 8 Drawing Sheets

U.S. PATENT DOCUMENTS

| | | |
|---|---|---|
| 5,717,923 A | 2/1998 | Dedrick |
| 5,724,424 A | 3/1998 | Gifford |
| 5,724,521 A | 3/1998 | Dedrick |
| 5,724,524 A | 3/1998 | Hunt et al. |
| 5,727,129 A | 3/1998 | Barrett et al. |
| 5,740,549 A | 4/1998 | Reilly et al. |
| 5,748,954 A | 5/1998 | Mauldin |
| 5,752,238 A | 5/1998 | Dedrick |
| 5,758,257 A | 5/1998 | Herz et al. |
| 5,758,328 A | 5/1998 | Giovannoli |
| 5,768,521 A | 6/1998 | Dedrick |
| 5,774,170 A | 6/1998 | Hite et al. |
| 5,774,868 A | 6/1998 | Cragun et al. |
| 5,781,632 A | 7/1998 | Odom |
| 5,781,894 A | 7/1998 | Petrecca et al. |
| 5,794,210 A | 8/1998 | Goldhaber et al. |
| 5,826,241 A | 10/1998 | Stein et al. |
| 5,832,482 A | 11/1998 | Yu et al. |
| 5,835,896 A | 11/1998 | Fisher et al. |
| 5,848,397 A | 12/1998 | Marsh et al. |
| 5,848,407 A | 12/1998 | Ishikawa et al. |
| 5,850,433 A | 12/1998 | Rondeau |
| 5,850,520 A | 12/1998 | Griebenow et al. |
| 5,852,820 A | 12/1998 | Burrows |
| 5,855,008 A | 12/1998 | Goldhaber et al. |
| 5,864,845 A | 1/1999 | Voorhees |
| 5,864,846 A | 1/1999 | Voorhees et al. |
| 5,903,882 A | 5/1999 | Asay et al. |
| 5,905,975 A | 5/1999 | Ausubel |
| 5,915,243 A | 6/1999 | Smolen |
| 5,918,014 A | 6/1999 | Robinson |
| 5,920,854 A | 7/1999 | Kirsch |
| 5,920,859 A | 7/1999 | Li |
| 5,930,474 A | 7/1999 | Dunworth et al. |
| 5,933,811 A | 8/1999 | Angles et al. |
| 5,948,061 A | 9/1999 | Merriman |
| 5,974,398 A | 10/1999 | Hanson et al. |
| 5,991,735 A | 11/1999 | Gerace |
| 6,006,257 A | 12/1999 | Slezak |
| 6,009,410 A | 12/1999 | LeMole et al. |
| 6,023,686 A | 2/2000 | Brown |
| 6,026,369 A | 2/2000 | Capek |
| 6,055,510 A | 4/2000 | Henrick et al. |
| 6,058,379 A | 5/2000 | Odom et al. |
| 6,078,866 A | 6/2000 | Buck et al. |
| 6,161,099 A | 12/2000 | Harrington et al. |
| 6,189,003 B1 | 2/2001 | Leal |
| 6,253,189 B1 | 6/2001 | Feezell et al. |
| 6,269,361 B1 | 7/2001 | Davis et al. |
| 6,324,519 B1 | 11/2001 | Eldering |
| 6,360,222 B1 | 3/2002 | Quinn |
| 6,418,432 B1 | 7/2002 | Cohen et al. |
| 6,418,433 B1 | 7/2002 | Chakrabarti et al. |
| 6,463,430 B1 | 10/2002 | Brady et al. |
| 6,484,165 B1 | 11/2002 | Beall et al. |
| 6,496,843 B1 | 12/2002 | Getchius et al. |
| 6,523,021 B1 | 2/2003 | Monberg et al. |
| 6,560,620 B1 | 5/2003 | Ching |
| 6,564,208 B1 | 5/2003 | Littlefield et al. |
| 6,567,918 B1* | 5/2003 | Flynn et al. ............... 726/7 |
| 6,665,676 B2 | 12/2003 | Twig et al. |
| 6,714,934 B1 | 3/2004 | Fordham |
| 6,714,939 B2 | 3/2004 | Saldanha et al. |
| 6,785,671 B1 | 8/2004 | Bailey et al. |
| 6,785,688 B2 | 8/2004 | Abajian et al. |
| 6,801,906 B1 | 10/2004 | Bates et al. |
| 6,826,559 B1 | 11/2004 | Ponte |
| 6,842,906 B1* | 1/2005 | Bowman-Amuah ........ 719/330 |
| 6,868,525 B1 | 3/2005 | Szabo |
| 6,907,574 B2* | 6/2005 | Xu et al. ............ 715/767 |
| 6,973,448 B1 | 12/2005 | Monberg et al. |
| 7,031,961 B2 | 4/2006 | Pitkow et al. |
| 7,047,242 B1 | 5/2006 | Ponte |
| 7,080,064 B2 | 7/2006 | Sundaresan |
| 7,089,237 B2 | 8/2006 | Turnbull et al. |
| 7,110,993 B2 | 9/2006 | Soulanille et al. |
| 7,152,064 B2 | 12/2006 | Bourdoncle et al. |
| 7,206,778 B2 | 4/2007 | Bode et al. |
| 7,231,358 B2 | 6/2007 | Singh et al. |
| 7,234,107 B1* | 6/2007 | Aoki et al. .................. 715/207 |
| 7,272,597 B2 | 9/2007 | Chowdhury et al. |
| 7,272,637 B1 | 9/2007 | Himmelstein |
| 7,330,852 B2 | 2/2008 | Bailey et al. |
| 7,349,896 B2 | 3/2008 | Chowdhury et al. |
| 7,509,303 B1 | 3/2009 | Chen |
| 2001/0003177 A1 | 6/2001 | Schena et al. |
| 2001/0044837 A1 | 11/2001 | Talib et al. |
| 2001/0047354 A1 | 11/2001 | Davis et al. |
| 2002/0010015 A1 | 1/2002 | Acres |
| 2002/0026579 A1 | 2/2002 | Wiederin et al. |
| 2002/0026581 A1 | 2/2002 | Matsuyama et al. |
| 2002/0052894 A1 | 5/2002 | Bourdoncle et al. |
| 2002/0069197 A1 | 6/2002 | Katayama |
| 2002/0099700 A1 | 7/2002 | Li |
| 2002/0120506 A1 | 8/2002 | Hagen |
| 2002/0147738 A1 | 10/2002 | Reader |
| 2002/0152222 A1 | 10/2002 | Holbrook |
| 2002/0174089 A1 | 11/2002 | Tenorio |
| 2003/0014428 A1 | 1/2003 | Mascarenhas |
| 2003/0078991 A1 | 4/2003 | Harris |
| 2003/0093482 A1 | 5/2003 | Watanabe et al. |
| 2003/0101126 A1 | 5/2003 | Cheung |
| 2003/0135504 A1* | 7/2003 | Elvanoglu et al. ............ 707/100 |
| 2003/0167250 A1 | 9/2003 | Sash |
| 2003/0177076 A1 | 9/2003 | Might et al. |
| 2003/0177111 A1 | 9/2003 | Egendorf et al. |
| 2003/0212673 A1 | 11/2003 | Kadayam et al. |
| 2003/0220918 A1 | 11/2003 | Roy et al. |
| 2004/0006478 A1 | 1/2004 | Alpdemir et al. |
| 2004/0019601 A1 | 1/2004 | Gates |
| 2004/0023644 A1 | 2/2004 | Montemer |
| 2004/0051732 A1 | 3/2004 | White et al. |
| 2004/0064436 A1 | 4/2004 | Breslin et al. |
| 2004/0068508 A1 | 4/2004 | Sihvo et al. |
| 2004/0078224 A1 | 4/2004 | Schramm-Apple et al. |
| 2004/0107187 A1 | 6/2004 | Asobayire et al. |
| 2004/0111432 A1 | 6/2004 | Adams et al. |
| 2004/0143570 A1 | 7/2004 | Klock et al. |
| 2004/0143600 A1 | 7/2004 | Musgrove et al. |
| 2004/0148155 A1 | 7/2004 | Vogel |
| 2004/0148637 A1* | 7/2004 | Sterkin et al. ............... 725/115 |
| 2004/0167845 A1 | 8/2004 | Corn et al. |
| 2004/0186769 A1 | 9/2004 | Mangold et al. |
| 2004/0249713 A1 | 12/2004 | Gross |
| 2004/0254932 A1 | 12/2004 | Gupta et al. |
| 2004/0260604 A1 | 12/2004 | Bedingfield |
| 2005/0004835 A1 | 1/2005 | Roslansky et al. |
| 2005/0015307 A1 | 1/2005 | Simpson et al. |
| 2005/0021596 A1 | 1/2005 | Do |
| 2005/0071470 A1 | 3/2005 | O'Brien et al. |
| 2005/0074102 A1 | 4/2005 | Altberg et al. |
| 2005/0102270 A1 | 5/2005 | Risvik et al. |
| 2005/0108109 A1* | 5/2005 | Wittsche ............... 705/26 |
| 2005/0119957 A1 | 6/2005 | Faber et al. |
| 2005/0120006 A1 | 6/2005 | Nye |
| 2005/0124266 A1 | 6/2005 | Henderson |
| 2005/0125273 A1 | 6/2005 | Simons et al. |
| 2005/0125307 A1 | 6/2005 | Hunt et al. |
| 2005/0138018 A1 | 6/2005 | Sakai et al. |
| 2005/0154718 A1 | 7/2005 | Payne et al. |
| 2005/0160083 A1 | 7/2005 | Robinson |
| 2005/0192946 A1 | 9/2005 | Lu et al. |
| 2005/0203799 A1 | 9/2005 | Faber et al. |
| 2005/0246332 A1 | 11/2005 | Wang et al. |
| 2005/0267798 A1* | 12/2005 | Panara ............... 705/14 |
| 2005/0278309 A1 | 12/2005 | Evans et al. |
| 2005/0289168 A1 | 12/2005 | Green et al. |
| 2006/0010134 A1* | 1/2006 | Davis et al. ............... 707/10 |
| 2006/0036504 A1 | 2/2006 | Allocca et al. |
| 2006/0184417 A1 | 8/2006 | Van der Linden et al. |
| 2006/0190328 A1 | 8/2006 | Singh et al. |
| 2006/0282336 A1 | 12/2006 | Huang |
| 2007/0079282 A1* | 4/2007 | Nachnani et al. ............ 717/106 |

FOREIGN PATENT DOCUMENTS

| | | |
|---|---|---|
| WO | WO-97/17774 | 5/1997 |
| WO | WO-98/28906 | 7/1998 |

| WO | WO-98/34189 | 8/1998 |
| --- | --- | --- |
| WO | WO-99/20486 | 4/1999 |
| WO | WO-99/48028 | 9/1999 |
| WO | WO-00/00419 | 1/2000 |
| WO | WO-00/04190 | 1/2000 |
| WO | WO-00/16218 | 3/2000 |
| WO | WO-00/41090 | 7/2000 |
| WO | WO-02/103576 | 12/2002 |

OTHER PUBLICATIONS

Undated ebay search printout (showing 40 items found).
"Advisory Action", Advisory Action dated Jan. 9, 2008 in U.S. Appl. No. 10/948,425, (3 pages).
"Advisory Action", Advisory Action dated Jul. 31, 2007 in U.S. Appl. No. 10/800,444, (3 pages).
"Advisory Action", Advisor Action dated Jul. 31, 2007 in U.S. Appl. No. 10/800,444. (3 pages).
"Amended Appeal Brief filed", Amended Appeal Brief filed in U.S. Appl. No. 10/948.425 dated Jul. 15, 2008, (37 pages).
"Amendment After Appeal", Amendment After Appeal filed in U.S. Appl. No. 10/948,425 dated Jul. 15, 2008, (7 pages).
"Appeal Brief", Appeal Brief filed Oct. 15, 2007 in U.S. Appl. No. 10/800,444, (49 pages).
"Appeal Brief", Appeal Brief filed Oct. 5, 2007 in U.S. Appl. No. 10/800,444. (49 pages).
"Appeal Brief", Appeal Brief filed Feb. 19, 2008 in U.S. Appl. No. 10/801,156. (49 pages).
"Appeal Brief", Appeal Brief filed Apr. 8, 2008 in U.S. Appl. No. 10/948,425. (37 pages).
"BellSouth RealPages.com", BellSouth RealPages.com (as archived on archive.org).
"BizRate.com", BizRate.com (as archived on archive.org).
"business.com", business.com (as archived on archive.org).
"Citysearch.com", Citysearch.com (as archived on archive.org).
"Examiner Interview Summary", Examiner Interview Summary dated Jul. 10, 2007 in U.S. Appl. No. 10/800,444. (1 page).
"Examiner Interview Summary", Examiner Interview Summary dated Jul. 10, 2007 in U.S. Appl. No. 10/801,156. (1 page).
"Examiner Interview Summary", Examiner Interview Summary dated Jul. 19, 2005 in U.S. Appl. No. 10/680,952. (2 pages).
"Examiner's Amendment", Examiner's Amendment dated Oct. 7, 2008 in U.S. Appl. No. 10/948,425. (6 pages)
"Examiner's Answer", Examiner's Answer dated Jan. 11, 2008 in U.S. Appl. No. 10/800,444. (48 pages).
"Examiner's Answer", Examiner's Answer dated Mar. 28, 2008 in U.S. Appl. No. 10/801,156. (40 pages).
"Examiner's Statement on Notice of Allowance", Examiner's Statement on Notice of Allowance dated Oct. 11, 2005 in U.S. Appl. No. 10/680,952. (4 pages).
"Final Office Action", Final Office Action dated Oct. 22, 2007 in U.S. Appl. No. 10/801,156. (29 pages).
"Final Office Action", Final Office Action dated Nov. 9, 2007 in U.S. Appl. No. 10/948,425. (10 pages).
"Final Office Action", Final Office Action dated May 9, 2007 in U.S. Appl. No. 10/800,444. (32 pages).
"Final Office Action", Final Office Action dated May 9, 2007 in U.S. Appl. No. 10/800,444. (32 pages).
"Final Office Action", Final Office Action dated Sep. 4, 2008 in U.S. Appl. No. 11/340,647. (31 pages).
"Internet Discussion Group", Internet Discussion Group, Aug. 7, 2001.
"Lycos Adds New Features, Reorganizes Suggested Links", "Lycos Adds New Features, Reorganzies Suggested Links" from http://www.searchenginewatch.com/sereport/98/01-lycos.html, Jan. 9, 1998.
"Lycos Adds Predetermined Listing", "Lycos Adds Predetermined Listings"from http://www.searchenginewatch.com/sereport/97/12-lycos.html, Dec. 4, 1997.
"Non-Final Office Action", Non-Final Office Action dated Nov. 3, 2008 in U.S. Appl. No. 10/800,887. (22 pages).
"Non-Final Office Action", Non-Final Office Action dated Feb. 10, 2009 in U.S. Appl. No. 11/180,123, (30 pages).
"Non-Final Office Action", Non-Final Office Action dated Mar. 30, 2009 in U.S. Appl. No. 11/180,136, (27 pages).
"Non-Final Office Action", Non-Final Office Action dated Apr. 19, 2007 in U.S. Appl. No. 10/801,156. (31 pages).
"Non-Final Office Action", Non-Final Office Action dated May 11, 2005 in U.S. Appl. No. 10/680,952. (39 pages).
"Non-Final Office Action", Non-Final Office Action dated May 13, 2008 in U.S. Appl. No. 10/800,887. (8 pages).
"Non-Final Office Action", Non-Final Office Action dated Jun. 29, 2007 in U.S. Appl. No. 10/948, 425. (7 pages).
"Notice of Allowance", Notice of Allowance dated Oct. 7, 2008 with Examiner's Amendment in U.S. Appl. No. 10/948,425. (13 pages).
"Notice of Allowance", Notice of Allowance dated Nov. 18, 2008 in U.S. Appl. No. 10/948,425. (12 pages).
"Reply Brief", Reply Brief filed Mar. 11, 2008 in U.S. Appl. No. 10/800,444. (21 pages).
"Reply Brief", Reply Brief filed May 9, 2008 in U.S. Appl. No. 10/801,156, (17 pages).
"Response to Final Office Action", Response to Final Office Action dated Nov. 9, 2007 in U.S. Appl. No. 10/948,425. (9 pages).
"Response to Final Office Action", Response to Final Office Action dated May 9, 2007 in U.S. Appl. No. 10/800,444. (18 pages).
"Reponse to Final Office Action", Response to Final Office Action dated Sep. 4, 2008 in U.S. Appl. No. 11/340,647, (24 pages).
"Response to Non-Final Office", Response to Non-Final Office Action dated Feb. 10, 2009 in U.S. Appl. No. 11/180,123. (7 pages).
"Response to Non-Final Office Action", Response to Non-Final Office Action dated Nov. 3, 2008 in U.S. Appl. No. 10/800,887. (17 pages).
"Response to Non-Final Office Action", Response to Non-Final Office Action dated Nov. 24, 2006 in U.S. Appl. No. 10/800,444. (14 pages).
"Response to Non-Final Office Action", Response to Non-Final Office Action dated Apr. 19, 2007 in U.S. Appl. No. 10/801,156. (17 pages).
"Response to Non-Final Office Action", Response to Non-Final Office Action dated May 11, 2005 in U.S. Appl. No. 10/680,952. (17 pages).
"Response to Non-Final Office Action", Response to Non-Final Office Action dated May 13, 2008 in U.S. Appl. No. 10/800,887. (11 pages).
"Response to Non-Final Office Action", Response to Non-Final Office Action dated Jun. 29, 2007 in U.S. Appl. No. 10/948,425. (9 pages).
"Response to Restriction Requirement", Response to Restriction Requirement dated Jan. 8, 2007 in U.S. Appl. No. 10/801,156, (3 pages).
"Restriction Requirement", Restriction Requirement dated Jan. 8, 2007 in U.S. Appl. No. 10/801,156, (5 pages).
"Supplemental Appeal Brief", Supplemental Appeal Brief filed Nov. 2, 2007 in U.S. Appl. No. 10/800,444. (50 pages).
Anon, "Corporate Profile for Easy Wireless Inc.", Anon., "Corporate Profile for Easy Wireless Inc., dated Jul. 9, 1999, " Business Wire, Jul. 16 1999.
Anon, "Digest (News Briefs)", Anon., "Digest (News Briefs)." New Media Age, 4, Mar. 16, 2000.
Anon, "Google Does Well Despite Not Taking Paid Placements", Anon., "Google Does Well Despite Not Taking Paid Placements," Secured Lender, vol. 58, No. 2, p. 80, Mar./Apr. 2002.
Anon, "Google Introduces New Pricing for Popular Self-Service Online Advertising Program", Anon., "Google Introduces New Pricing for Popular Self-service Online Advertising Program; Highly Targeted Text-based Ads Complement Google's Objective Search Results," Business Wire, Feb. 20, 2002.
Anon, "Google Launches Self-Service Advertising Program", Anon., "Google Launches Self-Service Advertising Program; Google's AdWords Program Offers Every Business a Fully Automated. Comprehensive and Quick Way to Start an Online Advertising Campaign," Business Wire, Oct. 23, 2000.
Anon, "Guidant Announces FDA Clearance of the RX HERCULINK 14 Biliary Stent System", Anon., "Guidant Announces FDA Clearance of the RX HERCULINK 14 Biliary Stent System, " Business Wire, Sep. 7, 1999.

Anon, "Northern Light Teams with Search4Science", Anon., "Northern Light Teams with Search4Science, University of Pennsylvania," Information Today, vol. 18, No. 7, p. 24, Jul./AuQust 2001.
Anon, "The CORE Network Selects PropertyFirst.com as Online Marketing Partner, Technology Platform—With 80 U.S.", Anon., "The CORE Network Selects PropertyFirst.com as Online Marketing Partner, Technology Platform—With 80 U.S. Member Firms. CORE Will Use PropertyFirst Services to Strengthen Connectivity, Productivity, and Online Branding," Business Wire, Nov. 16.
Anon, "Toshiba Expands e-Studio Line", Anon., "Toshiba Expands e-Studio Line," Office Solutions, vol. 19. No. 2, Feb. 2002.
Dzilna, "Publishers Fight Declines in Web Advertising CPMs", Dziina, D., "Publishers Fight Declines in Web Advertising CPMs," Folio: the Magazine for Magazine Management, vol. 28, No. 3, p. 70, Mar. 1999.
Fleishman,, "Technology Briefing Internet: Google Adds Ad Option", Fleishman. G., "Technology Briefing Internet: Google Ads Ad Options," New York Times, Late Edition, p. 7, col. 5, Feb. 21, 2002.
Ghiselli, Cristina et al., "A Unified Access to Extract Knowledge from Heterogeneous Web Archives", Ghiselli, C., et al., "Unified Access to Extract Knowledge from Heterogeneous Web Archives, A," Online Information Review, vol. 25, No. 5, pp. 299-310, 2001.
Gwin, Peter, "BT Claims Patent on Hyperlinks", Gwin, P., "BT Claims Patent on Hyperlinks," Europe, No. 398, p. 6, Jul./Aug. 2000.
Haar, "Service To Let Ad Bids Dictate Search Rankings", Haar, "Service To Let Ad Bids Dictate Search Rankings" from Tech InfoBase, Feb. 23, 1998.
Hansell, "Clicks for Sale; Paid Placement Is Catching On in Web Searches", Hansell, S., "Clicks for Sale; Paid Placement Is Catching on in Web Searches," New York Times, late Edition, p. 1, col. 2, Jun. 4, 2001.
Kuchinskas, "Attention, please", Kuchinskas, S., "Attention, please," Brandwek, vol. 41, No. 3, pp. 56-60, Jan. 17, 2000.
Maddox, "Slicing up IT Niches", Maddox, K., "Slicing up IT Niches," BtoB, vol. 88. No. 6, p. 20, Jun. 9, 2003.
Mardesh, "Search engine charges hit sites", Mardesh, "Search engine charges hit sites" from San Jose Mercury News, Feb. 21, 1998.
McKellar, Hugh , "The New Business Intelligence", McKellar, H. "The New Business Intelligence," InformationToday, Jan. 2003.
McKenna, "New Search Engines Go to Charges for Hits", McKenna, "New Search Engines Go To Charges For Hits" from Tech InfoBase, Feb. 23, 1998.
Pelline, "New search engine goes commercial", Pelline, "New search engine goes commercial" from http://news.cnet.com/news/0,10000,0-1005-200-326672,00.html, Feb. 18, 1998.
Pontin, "Gross Idea", Pontin, "Gross Idea" from http://www.herring.com/story_redirect.asp?layout=story_generic&doc-id=RH640016664&ch..., Aug. 6, 2001.
Rao, Ramana, "From Unstructured Data to Actionable Intelligence", Rao, R., "From Unstructured Data to Actionable Intelligence," IT Pro, Nov./Dec. 2003, pp. 29-35.
Rich, "New Search Engine Allows Sites to Pay Their Way to Top", Rich, "New Search Engine Allows Sites to Pay Their Way to Top" from http://www.adweek.com, Feb. 23, 1998.
Riedman, "Search engine startup to auction listings", Riedman, "Search engine startup to auction listings" from Advertising Age, Feb. 23, 1998.
Sherman, "Google introduces web directory using netscape's open directory project data", Sherman, C. "Google introduces web directory using netscape's open directory project data," Information Today, vol. 17, No. 5, p. 14, Mar. 27, 2000.
Swartz, "Browser Only Lists Paying Web Sites", Swartz, "Browser Only Lists Paying Web Sites" from San Francisco Chronical, Feb. 21, 1998.
Tedeschi, "To attract more advertising from small businesses, search engines contemplate replacing a click with a rinq", Bob Tedeschi, To attract more advertising from small businesses, search engines, contemplate replacing a click with a ring. The New York Times, Jun. 7, 2004.
Townsend, Anthony M. et al., "Recasting HRIS as an Information Resource", Townsend, A.M., et al., "Recasting HRIS as an Information Resource," HRMagazine, vol. 41, No. 2, p. 91, Feb. 1996.

Wagstaff, Sean, "Dreamweaver 2 Satisfied Design, Management", Wagstaff, S., "Dreamweaver 2 Satisifies Design, Management," eMediaweekly, 26(1). Jan. 4, 1999.
Webb, "Search Engine Resurgence", Webb, CL., "Search Engine Resurgence," WashingtonPost.com, Feb. 19, 2003.
Restriction Requirement dated Sep. 30, 2009 in U.S. Appl. No. 11/237,813.
Response to Sep. 30, 2009 Rr in U.S. Appl. No. 11/237,813.
Appeal Brief filed Nov. 9, 2009 in U.S. Appl. No. 11/180,123.
Rajghatta, Chidanand, "US voices its concern over violence in gujarat," Times of India, Apr. 17, 2002.
Search Tools—Hotrate Those Replies, Information World Review, Hotrate.com, Mar. 1, 2000.
Weidlich, Thom, "Search Engine Marketing Revving Up," Catalog Age, v19n12, pp. s3, Nov. 2002.
Response filed Aug. 15, 2009 to Jun. 9, 2009 Final OA in U.S. Appl. No. 11/180,123.
Ostrom, Mary Anne, "New Web Portal Has Text-Only Ads Myway Seeks to Lure Visitors From Bolder Sites Such As Yahoo," San Jose Mercury News, Oct. 29, 2002.
Tomaiuolo, Nicholas G., et al., "Maximizing Relevant Retrieval," ProQuest Info & Learning, Nov./Dec. 1998.
Interview Summary dated Aug. 10, 2009 in U.S. Appl. No. 11/180,123.
Woods, Wendy, "Internet Update," Newsbytes, Jan. 17, 2002.
Ojala, Marydee, "Google Views the Present, Future," Information Today, V20n1, p. 1, Jan. 2003.
Anonymous, "Google Comes Out Ahead," Link-up, V17n5, p. 1, Sep./Oct. 2000.
Final OA dated Jun. 9, 2009 in U.S. Appl. No. 11/180,123.
Mahanta, Vinod, et al., "BT Dotcom," Business Today India, p. 72, Apr. 7, 2001.
Advisory Action dated Aug. 27, 2009 in U.S. Appl. No. 11/180,123.
Anonymous, "Advertisers attack google over adwords enhancement," New Media Age, pp. 3, Oct. 16, 2003.
Reply Brief filed Apr. 30, 2010 in U.S. Appl. No. 11/180,123.
Non-Final OA dated Jan. 8, 2010 in U.S. Appl. No. 11/237,813.
Examiner's Answer dated Mar. 17, 2010 in U.S. Appl. No. 11/180,123.
Response to Non-Final OA of Jan. 8, 2010 filed Mar. 11, 2010.
Chacon, Robert, "Small Business—Pay-per-click Internet ads hit with niche businesses," The Business Press, Ontario, CA, p. 8, Jul. 28, 2003.
Warner, Judy, "Pile and Co. to offer online search service," Adweek (Eastern Ed.) v40n3, pp. 5, Jan. 18, 1999.
Anonymous, "The Great Search Engine Debate," Marketing Week, Nov. 29, 2001.
O'Leary, Mich, "Business.com: Biggest business directory," Link-up, v19n4, pp. 9-10, Jul./Aug. 2002.
Notess, Greg R., "Internet search engine update," Online, v26n2, pp. 18, Mar./Apr. 2002.
Keane, Patrick, "RBOCs & start-ups battle for listings," Interactive Content, v2, p. 2 (1), Nov. 1996.
Kanell, Michael E., "Personal Technology Bellsouth Putting Yellow Pages Online," Atlanta Journal-Constitution, Apr. 20, 1997.
Helen, posting on alt.windows98, Sep. 7, 2002.
Anonymous, "Getting Wired for Sales; Part 2 of 2 part," Response TV, v 5, n 7, p. 46+, Mar. 1997.
Dogpile.com (as archived on archive.org) InfoSpace, Inc., Copyright 2003.
Examiner's Answer dated Jan. 11, 2008 in U.S. Appl. No. 10/800,444.
Findwhat.com (as archived on archive.org). Copyright 2003.
Google.com (as archived on archive.org). Copyright 2001.
Looksmart.com (as archived on archive.org). Copyright 2003.
metacrawler.com (as archived on archive.org). InfoSpace, Inc. Copyright 2003.
MSN.com (as archived on archive.org). Microsoft Corporation. Copyright 2003.
Office Action dated Nov. 24, 2006 in U.S. Appl. No. 10/800,444. (32 pp.).

qwestdex.com (as archived on archive.org). QwestDex. Copyright 1997-2003.

Shopping.com (as archived on archive.org). DealTime Ltd. Copyright 2000-2003.

Smartpages.com (as archived on archive.org). SBC Properties, L.P. Copyright 2003.

Superpages.com (as archived on archive.org). Verizon. Copyright 1995-2002.

WebCrawler.com (as archived on archive.org). InfoSpace. Copyright 2004.

Yahoo.com (as archived on archive.org). Yahoo! Inc. Copyright 2001.

Restriction Requirement dated Sep. 30, 2009 in U.S. Appl. No. 11/237,813. (7 pages).

Response to Restriction Requirement dated Sep. 30, 2009 in U.S. Appl. No. 11/237,813. (7 pages).

* cited by examiner

DYNAMIC COMPARISON TEXT FUNCTIONALITY

CROSS REFERENCES TO RELATED APPLICATIONS

The present application is related to U.S. patent application Ser. No. 11/060,209, entitled "METHOD FOR EXTRACTION AND SELECTION OF ENHANCED BUSINESS INFORMATION FROM WEBSITES, BUSINESS PROFILES AND ADVERTISING PRODUCTS", and U.S. patent application Ser. No. 11/060,243, entitled "IMPROVING SEARCH RELEVANCE AND YELLOW PAGE CLASSIFICATION INTEGRATION BY USING BUSINESS PROFILE CONTENT AND VERTICAL INDUSTRY TEMPLATES", both filed Feb. 17, 2005, and also U.S. patent application Ser. No. 10/948,425, entitled "BUSINESS RATING PLACEMENT HEURISTIC", filed on Sep. 23, 2004, and U.S. patent application Ser. No. 10/680,952, entitled "INFORMATION DISTRIBUTION SYSTEM", filed on Oct. 8, 2003, and which further claims priority from U.S. Provisional Application No. 60/505,597, entitled "INFORMATION DISTRIBUTION SYSTEM", filed Sep. 24, 2003, and also U.S. application Ser. No. 10/800,887, filed Mar. 15, 2004, titled "INFORMATION DISTRIBUTION SYSTEM AND METHOD UTILIZING A POSITION ADJUSTMENT FACTOR", and also U.S. application Ser. No. 10/801,156, filed Mar. 15, 2004, titled "INFORMATION DISTRIBUTION SYSTEM AND METHOD UTILIZING A POSITION ADJUSTMENT FACTOR", and also U.S. application Ser. No. 10/800,444, filed Mar. 15, 2004, titled "INFORMATION DISTRIBUTION SYSTEM AND METHOD UTILIZING A POSITION ADJUSTMENT FACTOR". The contents and teachings of each of these applications are hereby incorporated herein by reference in their entireties.

BACKGROUND INFORMATION

A typical search on the World Wide Web, e.g., on a shopping web site, provides results that may be so numerous that a list of the results may require a user to scroll through the list and/or navigate many pages in order to see all of the results. The results are typically viewed by the user to determine whether there are any listings of interest; e.g., items for purchase, user reviews, ratings, coupons, business profile information, products, auction items, etc. The user may be interested only in a single listing in a set of search results. However, some web sites allow a user to select multiple listings in a set of results and compare the listings in order to improve the efficiency and accuracy of the user's decisions, e.g., to purchase a listing. For example, as is known, selection of a plurality of listings in what may be referred to as a "compare operation" may cause information about the listing to be displayed in a chart or table in a web page.

Unfortunately, known compare operations suffer from a number of shortcomings. For example, a user may be provided a list of web search results having on the order of one hundred (100) listings that match a search query. The user must scroll through the list of listings to determine which listings to view in greater detail and/or compare to other listings. When the user decides that a listing is worth comparing to other listings, present systems and methods require that the user click a standard check box or the like in a graphical user interface (GUI) indicating that the user wants the listing to be compared to other listings. However, the selection of the checkbox (or similar input mechanism) does not initiate the compare operation itself.

Once the user has selected, i.e., checked, the desired checkboxes or the like, present web pages require that the user then visually search the web page for compare links at the top and/or the bottom of a web page providing search results. A compare link, when selected, initiates a compare operation for the selected results. However, depending upon the number of the results, the user may disadvantageously and inefficiently have to scroll an unwieldy distance through the web page in order to find the compare links because the present systems and methods typically locate such links at the beginning or end of the results list. The additional scrolling and searching required to locate a compare link is time consuming, annoying, and may in fact prevent the user from searching, comparing, and purchasing.

Thus, present systems and methods for comparing listings in search results are cumbersome and inflexible. In a large set of results, once a user has selected all of the listings he or she wishes to compare to one another, the user must wade through the results until a compare link is found. This is particularly difficult if the listings chosen for comparison are located near the middle of a page of results. When scrolling long distances, the user may become tired or disoriented, thus making the review of search results inefficient and impractical. Such disadvantages may, for example, dissuade a shopper from using a compare feature in a shopping web site because of the difficulty of making selections, and may prevent selection of search results including purchases based on search results.

According to some previous attempts to solve the foregoing problems a new input mechanism, e.g. a button, is dynamically created next to a listing (on the far right hand side) when it is selected for comparison. This button may be used to initiate a compare operation. However, a serious and common problem in creating new buttons is that when the new buttons appear outside the area that the user is perusing (that is, the selection area), or drawn on a portion of the page not typically used for listing search results, the user may not see the new buttons at all, or the new buttons may be confusing. Such a button is generally not fully drawn on the visible portion of the page depending upon the width of a browser window. Therefore, a user must scroll the page to the right in order to see such new buttons. Moreover, such scrolling occurs only if the user realizes that the newly added buttons exist and are to be used to compare listings. Because the buttons appear physically farther away from the selection area, the user may never see the appearance of the buttons. Moreover, if the button is placed over the listing description, which is often the case due to the limited amount of space available, the layout may be compromised by reducing the amount of information presented about each product that the user is reading to base the compare decision upon. Thus, an additional button that takes away descriptive information creates a situation in which the user is less informed in making a decision based on the comparison of listings in the search results.

New buttons may further distract a user because the user must determine what actions the buttons perform and why the buttons appeared in the first place. Even by looking at and studying new buttons, the user may not know what functions the buttons may activate. This may lead the user to ignore new buttons. The end result of such new buttons is the confusion and frustration of the user.

Accordingly, there is a need for a solution that minimizes the amount of scrolling required by a user wishing to compare products. Such a solution would preferably afford the initiation of a comparison of selected listings from within a set of results. Such a solution would also preferably permit a comparison to be initiated near each selected listing or group of listings. Further, it would be a preferable feature that an input mechanism minimize user of space while still being easily manipulated. Additionally, it would be preferable that the solution appear in the same general location as the selection area so that the user's eyes are already fixed on the location. It would also be desirable that the comparison label be available immediately after any listing is selected. Preferably, the solution would allow for a variety of displayed text or graphics depending on the status of an associated form input with the enablement of an action.

BRIEF DESCRIPTION OF THE DRAWINGS

The features and inventive aspects will become apparent upon reading the following detailed description, claims, and drawings, of which the following is a brief description:

DETAILED DESCRIPTION OF THE PREFERRED EMBODIMENTS

Figure 1:
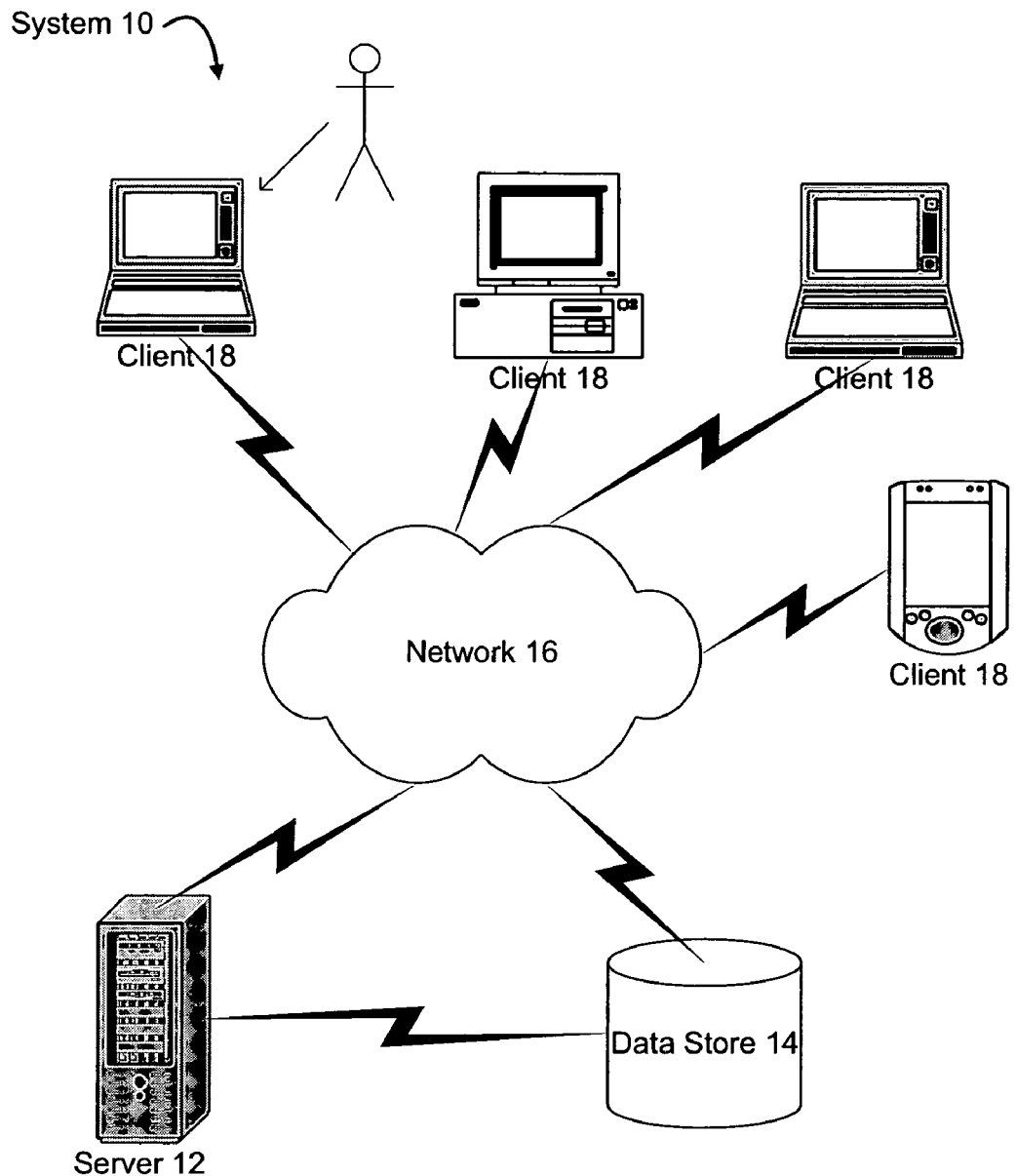
FIG. 1 illustrates a hardware architecture, according to an embodiment

Referring now to the drawings, illustrative embodiments are shown in detail. Although the drawings represent certain embodiments, the drawings are not necessarily to scale and certain features may be exaggerated to better illustrate and explain an innovative aspect of an embodiment. Further, the embodiments described herein are not intended to be exhaustive or otherwise limiting to the precise form and configuration shown in the drawings and disclosed herein.

Referring to FIG. 1, in various embodiments system 10 may include at least one web server 12, at least one data store 14, at least one network 16, at least one client 18, and at least one user. Other embodiments include more than the illustrated clients 18, thus increasing the number of physical computing machines that are part of system 10. Further, in some embodiments web server 12 and data store 14 are on separate logical/virtual computing machines, although web server 12 and data store 14 are located on the same physical computing machine.

Web server 12 may include any web server hardware and/or software such as will be known to those skilled in the art. In one embodiment web server 12 includes a computer using the Linux operating system, but those skilled in the art will recognize that any of a number of known operating systems, e.g., Windows®, Unix, etc., could be used in the context of system 10.

Data store 14 may be a relational database, a file system, or any other electronic data storage system known to those skilled in the art. In one embodiment, data store 14 includes a relational database software program that executes on a server computer using the Linux operating system. For example, in one embodiment, the relational database software program is MySQL, although those skilled in the art will recognize that data store 14 could include a wide variety of relational database programs. Further, those skilled in the art will recognize that data store 14 could include multiple software programs and/or multiple computers, and further that data store 14 could be implemented using any one of a number of known computer operating systems. Moreover, some embodiments include more than one data store 14.

Server 12, data store 14, and clients 18 generally communicate over network 16. Network 16 may be a private and/or public data network such as the Internet, a telecommunications wireless network, a local area network, a wide-area network, or any other type of network such as is known to those skilled in the art. Moreover, network 16 may be a combination of these or other different types of networks. Further, network 16 may be wireless, wired, or some combination of wired and wireless. System 10 is not restricted to a particular type of network 16. Moreover, system 10 is particularly advantageous in that, in embodiments in which network 16 is the Internet, system 10 is not restricted to a particular wireless network or standard. Any client 18 that can access the Internet can access system 10.

Generally speaking, client 18 enables users to access information stored in data store 14. In some embodiments, client 18 may access data computed from data stored in client 18 or some other component of system 10 instead of or in addition to accessing data stored in data store 14. For example, as will be understood by those skilled in the art, data store 14 could include a relational database capable of executing stored procedures that are called by a program accessible from client 18. Also, client 18 could contain a cache of data likely to be requested by a user. Client 18 may be any computing device capable of displaying a listing and capable of connection to a network, including a desktop computer, laptop computer, notebook computer, tablet computer, handheld computer, personal digital assistant, cellular telephone, etc. Functionality provided by client 18 in various embodiments is described further below. Most embodiments include a plurality of clients 18.

Accordingly, those skilled in the art will recognize that the various processes described herein with reference to client 18 and server 12, including data store 14, may be implemented at least in part as instructions executable by one or more computers. In general, a processor (e.g., a microprocessor) receives instructions, e.g., from a memory or other computer-readable medium, and executes those instructions, thereby performing one or more processes, including one or more of the processes described herein. Such instructions may be stored and transmitted using a variety of known computer-readable media.

A computer-readable medium includes any medium that participates in providing data (e.g., instructions) which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 2:
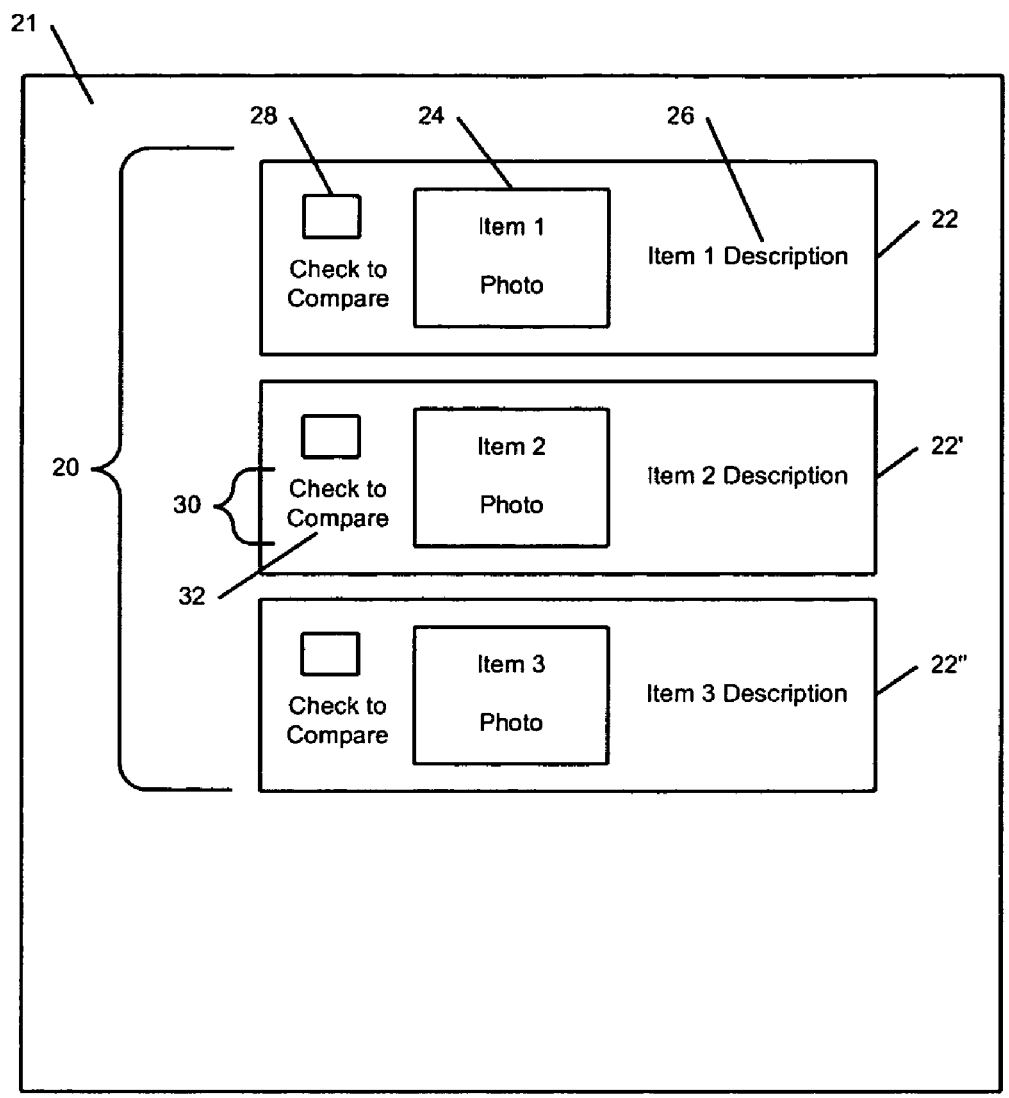
FIG. 2 illustrates a listing of results, a check box, and a dynamic label, according to an embodiment.
Figure 3:
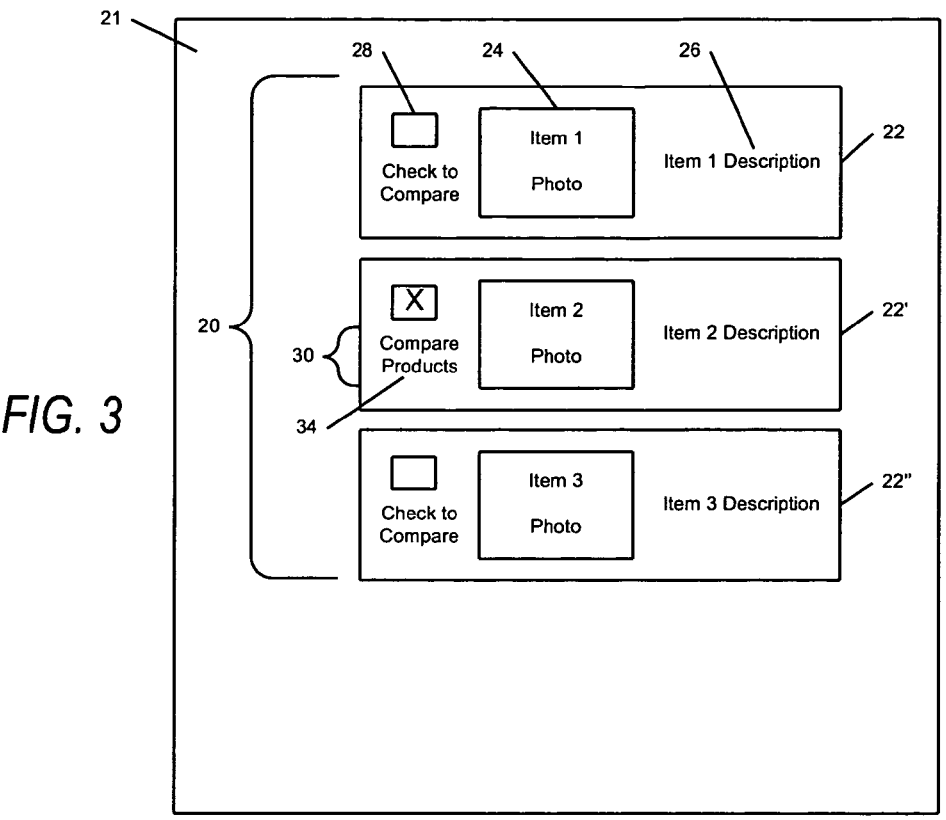
FIG. 3 illustrates a dynamic label having a changed state from the listing of FIG. 2, according to an embodiment.

Referring now to FIG. 2 and FIG. 3, a list 20 of search results is shown. List 20 is comprised of two or more listings 22. Listings 22 may include a photo 24 and a brief description 26 and/or any other information useful to a user in determining whether or not to activate a form input 28 to select listings 22; e.g., a check box or other input known to those skilled in the art. The total number of listings 22 is not limited to the few illustrated in FIG. 2 and FIG. 3. Typically, a large number of listings 22 are provided by server 12. However, listings 22 may be separated into multiple web pages 21 to facilitate easier viewing by a user. The purpose of list 20 is to provide an effective display of listings 22 such that a user may make selections for purchase or for comparison. Accordingly, various embodiments may be practiced with a retail shopping system, an auction bidding system, or simply a competitive comparison system for later purchase at a brick and mortar store, to provide a few examples.

A user typically browses list 20 and views brief descriptions 26, each associated with listings 22, in order to decide whether or not to select listing 22 using form input 28. Each listing 22 is preferably associated with form input 28 and a dynamic label 30. However, it is foreseeable that some listings 22 may be placed in list 20 yet may not be associated with form input 28, dynamic label 30, or either, for various reasons, e.g., such as the unavailability of a listing or the expiration of descriptive content.

List 20 is assembled onto a web page 21 illustrated in FIG. 2, for display on client 18 and for use by a user. A user may review listings 22 and decide which, if any, to compare with other selected listings. As a user is browsing listings 22, he or she may select one of listings 22 for comparison by selecting form input 28. Later, selected listings 22 may be compared with one another by sending a link to server 12 that directs server 12 to reply with a page that includes a comparison of selected listings 22. Form input 28 thereby provides a fast and intuitive method for grouping listings 22.

In one embodiment, form input 28 is embodied as a check box, known to those skilled in the art. Form input 28 allows a user to select various listings 22 by clicking the box in order to check the box using an input device such as a mouse, trackball, touch pad, pointer, etc. Thus, when form input 28 is checked a selection is made of the associated selected listing 22. Form input 28 allows a user to scroll through list 20 and determine which listings 22 are to be grouped together for a future action, e.g., comparison. Form input 28 may also be unchecked if a user decides to exclude the associated listing 22 from the future action.

Further, each check box may include an invisible link that provides for a change in dynamic label 30. The invisible link is a hidden HTML form input known to those skilled in the art. Additionally, each check box may activate a JavaScript function or the like for recording selection information concerning product information fields as well as links (explained below with regard to the buttons in FIG. 4) on the page.

Product information fields may include the product name, manufacturer, model, color, style, a unique identifier string, or similar characteristic information related to the product. Selection information is generally a repository of collected information that identifies to client 18, and/or server 12, which listings 22 have been selected and other attributes that are necessary or desired related to the selections. The selection information is discussed in detail below regarding FIG. 4 and regarding aggregate information.

In some embodiments an invisible link associated with form input 28, discussed above, triggers execution of a script by client 18 that may perform certain functions. These functions may include selecting or deselecting form input 28, as is known in the art, and/or counting the number of form inputs 28 that are selected on a page. The counting function may be used at least to determine whether or not to change the state of the associated dynamic label 30 as is explained in detail below with respect to FIG. 5A. The script may determine total counts related to selected listings 22 using the current web page 21 and/or previous web pages 21.

Dynamic label 30 includes a label text 32 and the possibility for an action (not shown) to be taken when dynamic label 30 is clicked by a user. Label text 32 may dynamically change, based on events related to dynamic label 30, or listing 22, or both, using JavaScript or other programming techniques known to those skilled in the art. Server 12 provides client 18 with web page 21 that includes label texts 32, 34 in both forms. The change from label text 32 to label text 34 is typically performed on client 18 using a script that is also provided by server 12 with web page 21. The change to dynamic label 30 may also be performed on the server 12. However, some disadvantages of changing or updating dynamic label 30 on the server 12 may include an increased load on server 12 for processing the information as well as increased traffic on network 16. Some advantages to server 12 processing may be near real-time tracking of the selection of listings 22.

Because dynamic label 30 is associated with listing 22, any change to the status of listing 22 or associated form input 28 may trigger a change in dynamic label 30. For example, as shown in FIG. 2, when form input 28 is unchecked, label text 32 of dynamic label 30 includes the text "check to compare." When form input 28 is checked, updated label text 34 of updated dynamic label 36 includes the text "compare products," as shown in FIG. 3. Thus, in one embodiment, label text 32, 34 may be changed back and forth between "check to compare" and "compare products" by checking form input 28. In some embodiments, the change of label text 32, 34 is accomplished by an invisible link, explained above, associated with form input 28.

Dynamic label 30 also provides an action when clicked. The action that is discussed here is intended to encompass the action taken when a user clicks dynamic label 30. For example, when a user clicks dynamic label 30, in some embodiments a link is sent to server 12 that informs server 12 that a comparison operation is to be performed on the selected listings 22. Server 12 in turn prepares and transmits a new page to client 18 that includes the selected listings 22 in a comparison format. However, the action is not limited to a comparison function.

The action is dependent upon the state of dynamic label 30 whose state is in turn dependent upon the associated form input 28, label text 32, and the status of listing 22. That is to say, dynamic label 30 may change state, depending on the rules defined for the particular embodiment, when the associated form input 28 changes state, e.g., form input 28 is checked. In one embodiment, the action is null when form input 28 is unselected (unchecked). That is to say, there is no action taken. Thus, when dynamic label 30 is clicked, no action is taken on any of listings 22 that are selected. On the other hand, when form input 28 is selected, e.g., checked, and another listing 22 is also selected, then the action taken is to compare every listing 22 having form input 28 selected.

In addition to the embodiments listed in FIG. 2 and FIG. 3, a script executed on client 18 or server 12 may be used to further organize listings 22 into categories. That is to say, listings 22 may be organized on the page based on factors such as price, price ranges, type, model, or a common attribute. Thus, the user is presented with a logical organization of listings 22 before making selections. Additionally, the script may be used to further organize listings 22 when selections are made. In one embodiment, for example, the script may organize listings 22 into groups arranged logically to surround the selected listing 22 when form input 28 is selected (checked).

Figure 5A:
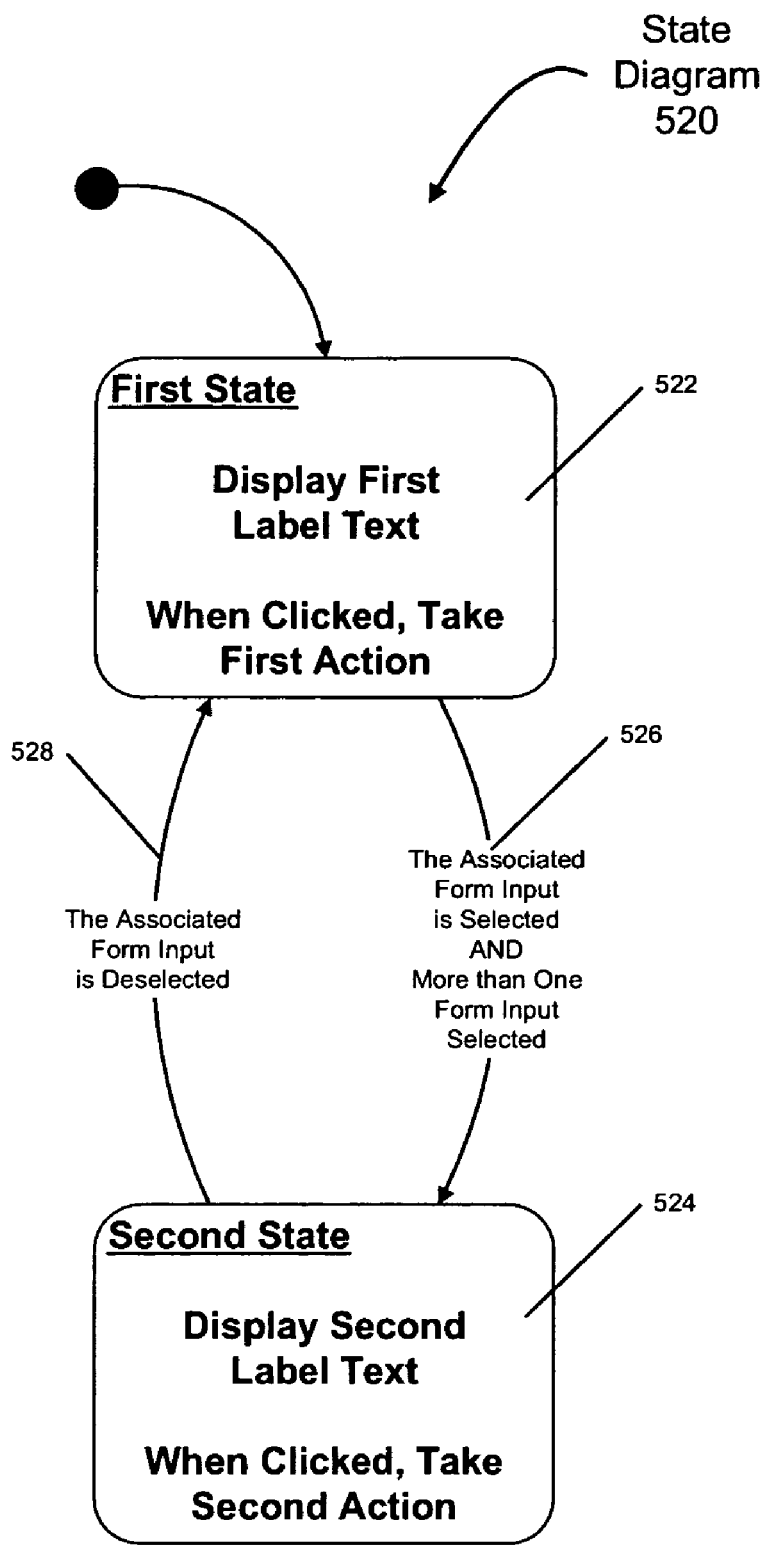
FIG. 5A is a state diagram for the dynamic label of FIGS. 2-4, according to an embodiment.

Referring now to FIG. 5A, a state diagram 520 for dynamic label 30 is shown. A first state 522 (also the initial state) displays first label text 32 and may take a first action when clicked. For example, the first action may be to select form input 28 when dynamic label 30 is clicked. Thus, a user may either select form input 28 directly; or may select form input 28 indirectly by clicking dynamic label 30, whereupon a hidden link will activate (e.g., become active) and select form input 28 directly. When selected, form input 28 will be checked. Upon selection of form input 28 associated with label 30, either directly or indirectly, when one or more other form inputs 28 are selected a state transition 526 is activated and dynamic label 30 is now in a second state 524. In this embodiment, state transition 526 does not occur until more than one form input 28 is selected because the second action is to compare listings 22. Because the compare function requires more than one listing 22 to make a comparison, the dynamic label 30 does not change state to enable the compare operation until more than one form input 28 is selected.

Second state 524, entered by selection of form input 28 and state transition 526, displays second label text 34 and may take a second action when clicked. Second state 524 is similar to first state 522 in that actions may be taken and label texts 32, 34 may be displayed. Key differences may be found in the actions and label texts 32, 34 that are assigned to each of first state 522 and second state 524. In this embodiment, second label text 34 announces to a user that dynamic label 30 is used to "compare products," as shown in FIG. 3. Thus, the second action is to compare each listing 22 that has form input 28 selected. When dynamic label 30 is clicked, a message is sent to server 12 that signals server 12 to initiate a compare operation, and the action by server 12 is to send a page back to client 18 that includes the information comparing each listing 22 that has form input 28 selected. When form input 28 is deselected, e.g., unchecked, a state transition 528 is activated and dynamic label 30 moves back to first state 522.

Alternatively, dynamic label 30 may change based on other information such as the availability of listing 22 and/or that the maximum number of listings allowed for comparison has been reached, i.e., information other than simply the state of form input 28. Thus, any number of actions could be taken for any combination of inputs. For example, a listing 22 that is selected may become unavailable while a user is selecting other listings 22; e.g., out of stock. In this case, the second action taken by server 12 may be to provide a new page with dynamic label 30 disabled for the particular listing 22. Alternatively, dynamic label 30 may be relabeled "out of stock," or "backordered." In these cases, the second action performed by server 12 is very different from the compare function that a user requested. However, a user may decide to compare the remaining listings by clicking the dynamic label 30 associated with one of the remaining listings. Additionally, dynamic label 30 may be embodied as text, boxed text, or a graphic, or a combination of embodiments. Further, the message provided by label text 34 may be updated or changed with or without notice to the user. For example, label text 34 may include information concerning the number of selections that have been made—in the case of the exemplary comparison feature, label text 34 may indicate the number of listings that have currently been selected for comparison ("Click to compare—3 items selected")—which may be updated for all label text 34 on page 21 upon further selection/deselection of listings 22 by the user. Further, label text 34 may be embodied as an icon or symbol.

Additionally, form input 28 may be automatically deselected in an embodiment, for example, when a compare operation is requested when a listing is, or becomes, out of stock. Alternatively, form input may be sent initially in second state 524, i.e., pre-selected, if the programming of server 12 decides that listing 22 should be showcased, e.g., a new item or a best seller. In other ways, form input 28 may become selected if a user initiates a "select all" link that may appear on web page 21 (not illustrated). Similarly, form input 28 may become deselected if a user initiates an "unselect all" link that may appear on web page 21 (not illustrated). Further, a process operating on client 18 may only allow a limited number of listings 22 to be selected. Thus, selection of form input 28 may not be allowed by client 18. As a result, form input 28 may become selected or deselected through an action by a user, by server 12, or by client 18 independently of the user.

Figure 4:
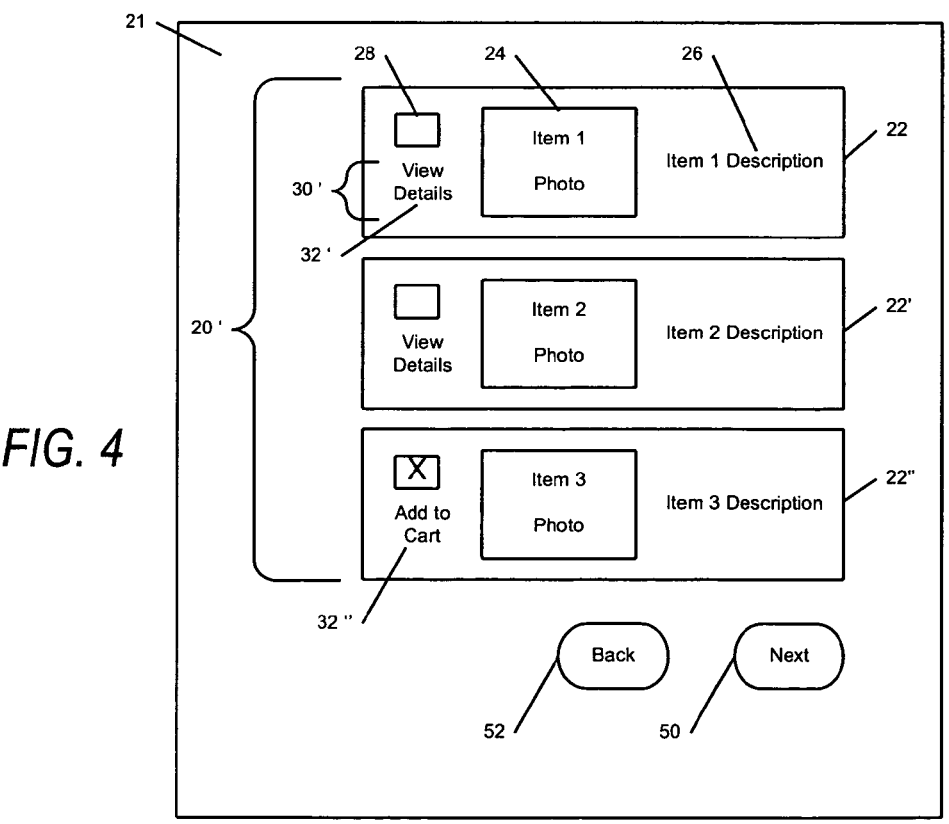
FIG. 4 illustrates a listing of results for online retailing using a dynamic label, according to an embodiment.

Referring now to FIG. 4, according to one embodiment, an online retailing search is described. Dynamic label 30' includes a first label text 32' of "view details" and a second label text 32" of "add to cart." The "view details" action of dynamic label 30' allows a user to see more detailed information related to the associated listing 22. The "add to cart" action of dynamic label 30' will place the associated listing 22 in a condition for check out where server 12 includes the selected listings 22 in a list that a user will purchase. While the embodiment of FIG. 4 may be optimized for electronic commerce, such a configuration is also apparent in the compare function itself. That is to say, electronic commerce benefits from the compare function because it allows a consumer to make an educated decision regarding the products under comparison. Additionally, alternative embodiments may include functions for adding to a group, deleting listings 22 and excluding listings 22.

List 20' provides a number of items for sale as listings 22, 22', 22". This embodiment is to be compared with the embodiment of FIGS. 2 and 3 where the second action of dynamic label 30 is to "compare" the selected listings. Here, form input 28 allows a user to group listings 22, 22', 22" for a later determination of whether or not to purchase the selected listings 22, 22', 22". When checked, form input 28 indicates that selected listings 22, 22', 22" will be "added to the cart" when such an action is initiated by a user. The action assigned to dynamic label 30' when "add to cart" is displayed as label text 32", is to add every listing 22, 22', 22" that has form input 28 checked to the cart. Thus, a user need not look for the "add to cart" button at the top and bottom of the page to perform the "add to cart" action. In this embodiment, the "add to cart" action is provided by dynamic label 30' at every location a desired listing 22, 22', 22" is located.

Further, when list 20, 20' spans more than one page, a next link 50, a back link 52, or both, may appear on the page to allow a user to fully traverse list 20 in order to select listings 22 for comparison. When a user traverses list 20', server 12 may receive and store aggregate selection information based on whether or not form inputs 28 are selected. The selection information is passed to other pages by the next link 50, or back link 52, in order to traverse multiple pages, through server 12. The passing of information may be accomplished in various ways know to those skilled in the art, e.g., through back link 52 and next link 50, a set of hidden values on the page, cookies, or parameters that are passed through a Uniform Resource Locator (URL) string so that the newly rendered page may maintain the selection information from previous pages, etc.

When spanning multiple pages, aggregate information may be collected for the selection information of each listing 22 that has been selected for all pages that a user has viewed. The aggregate information may include a unique identifier for the particular listing 22, and may also include relative information such as an index within the full list 20 or the page number that listing 22 appeared on. The aggregate information may also include the total number of selected listings 22 for all pages 21, and/or the total number of listings 22 selected for the present page 21. Server 12 may use this information to determine the efficacy of the order of listings 22, e.g., that more listings 22 are selected on the first page when a user has looked at four (4) pages indicates that the ordering is appropriate. In general, aggregate information is a collection of identifying characteristics related to list 20, as well as other information related to the user of client 18.

The aggregate information is important for an embodiment that chooses to maintain a store, e.g., a list or compilation, of selected listings 22 and transfer the store from page to page; e.g., a first page to a second or third page, etc. That is to say, the if the user were to check a box on the first page, the identifying information of the checked box (a unique identifier for the particular listing 22) is moved from page to page, either by scripts on client 18 or by transmitting the information to server 12, until the comparison function is invoked. In aggregating the information, efficiencies may be gained by not having to count all of the selected listings 22 each time another listing 22 is selected on another page. As information is aggregated, additional selections may be added to the aggregate by client 18. The information related to the count of selected listings 22 may be updated without having to count each and every listing 22 again that had been previously selected. Thus, client 18 may efficiently maintain the aggregate information and server 12 need not use resources for tracking a particular user's selection information. However, when an action is requested, such as a compare action, server 12 will, of course, use the aggregate information to build a compare page with the selected listings 22.

Typically, a user selects one, a plurality, or none of the products listed on a page and then clicks on next link 50 or back link 52. The selected product identifications as well as the thread identification may then be passed in a URL string, known to those skilled in the art. This accumulated information related to selection of listings 22 is then also sent to server 12 when the compare link is activated. Thus, the compare function can use the aggregate information that is sent in the URL string, by client 18 to server 12, to identify which listings 22 the comparison should be performed upon. Such aggregate information, as discussed above, is preferably stored by client 18 by hidden values on web page 21 or by cookies. However, in one embodiment, server 12 may track all selection information. Alternatively, both client 18 and server 12 may track the aggregate information.

By providing dynamic label 30 advantageously associated with listing 22, embodiments discussed herein reduce the effort required by a user to take an action on a list of listings 22. By providing dynamic label 30 with the ability to change label text 32 and actions, dynamic label 30 advantageously eliminates the need to scroll up or down a page to locate a specific action button, e.g., "compare." Rather, dynamic label 30, located near the listings 22, when clicked, triggers an action such as "compare" operation by server 12. Thus, when finished selecting listings 22, a user may immediately "click" dynamic label 30 to perform the action announced by label text 32. In this manner, dynamic label 30 affords a comparison action from within the results of a search rather than at the beginning or end of the list. Also, dynamic label 30 advantageously occupies only a small amount of space on a page. For example, in one embodiment a "check box", e.g., form input 28, is located near the upper left corner of listing 22 and dynamic label 30 is placed below the "check box." In such a configuration, dynamic label 30 occupies a minimum of space on page 21. (See FIG. 3).

Further, because dynamic label 30 updates label text 32 and the click action, the compare action is immediately available after every selection at the location of the selection. Label text 32 advantageously announces to a user what the action will be if dynamic label 30 is clicked. Additionally, when scrolling through list 20, each dynamic label 30 offers a user an opportunity to initiate an action while scrolling through list 20. This provides that, even if a user strays from any of selected listings 22, that a user can initiate an action by scrolling back through list 20 to selected listings 22, 22', 22" rather than going to the beginning or end of the listing.

Embodiments disclosed herein facilitate shopping by providing a simple and intuitive compare link at the location of form input 28. Because dynamic label 30 is located next to form input 28, the eyes of a user are already fixed on dynamic label 30 at that location. Thus, there is no chance that a user will not see dynamic label 30 when a change occurs in label text 32. Rather than popping up new buttons in different locations, embodiments of the present invention provide for a changed label at the same location. Confusion of users is avoided because the change to label text 32 is done right before the eyes of a user.

Additionally, because label text 32, 34 changes in place, rather than having a new button placed on web page 21, space on web page 21 is advantageously conserved. For the designers of the web page, or form, the width constraint is no longer tied to the compare button, or top and bottom compare buttons, or both. In any event, dynamic label 30 saves significant space by providing changes to label text 32 associated with an action where these changes may be done "in place." Thus a new button is not required and the page layout may be further optimized without using space for the compare operation.

To conserve space on web page 21, dynamic label 30 is able to replace first label text 32 in its place with second label text 34. This replacement scheme provides that a minimum of web page 21 space is used when second label text 34 is placed where the former label text 32 existed. However, dynamic label 30 may encounter situations where there is no change to label text 32 after a selection of the associated listing 22; e.g., if the associated listing 22 is the only listing 22 selected when dynamic label 30 is configured to initiate a compare operation, no change in state is needed to enable the compare functionality.

When label text 32 changes to second label text 34, the position of second label text 34 may be calculated in order to appropriately position second label text 34. The positioning may be performed in a number of ways including aligning the center location or left justification at the same position as the first letter of old label text 32. However, for best visual aesthetic, alignment of the center location is preferred. The center location, in an embodiment, may be the geometric center of the label text as is known to those skilled in the art. However, other embodiments may define the center location as the center of a graphic, e.g. a picture, that contains label text 32, 34. Further, the center location may include constraints to avoid placing label text 32, 34 over a portion of web page 21, form input 28, and/or listing 22.

Figure 5B:
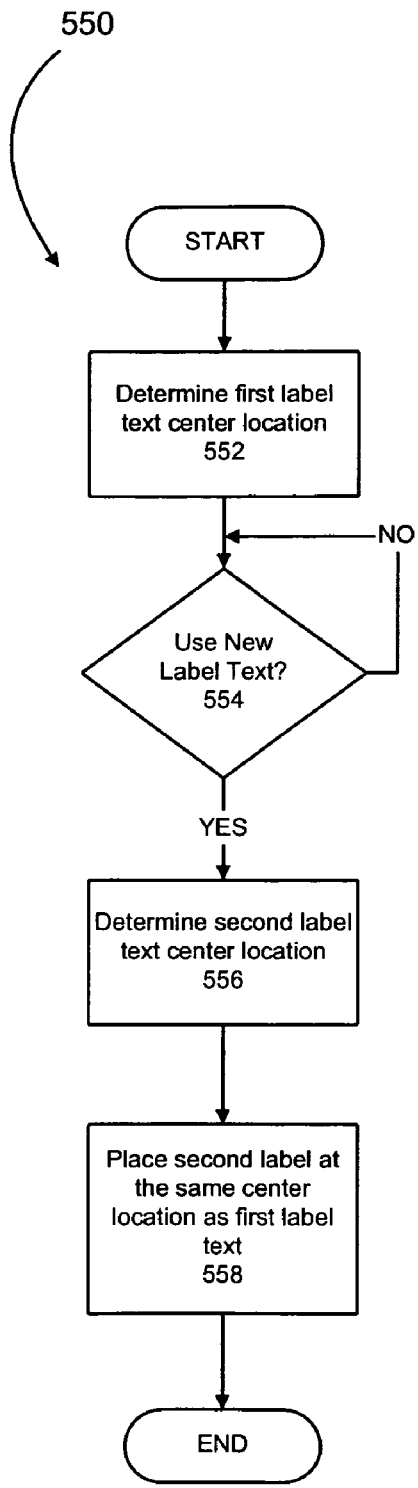
FIG. 5B is a process flow illustrating the placement of a dynamic label with new label text, according to an embodiment.

FIG. 5B is a process flow 550 illustrating the placement of dynamic label 30 with second label text 34, according to an embodiment. The process 550 may be executed on client 18 using a script, or, alternatively, may be executed on server 12 if a new web page 21 is required. In step 552, the center location of label text 32 of dynamic label 30 is calculated in order to determine where to locate the second label text 34, if appropriate. Following step 552, control proceeds to step 554.

In step 554, a determination is made as to whether a second label text 34 is required (explained in detail with respect to FIGS. 2-4 and FIG. 5A where the methods and triggering events for changing label text 32, 34 is described). If a state change occurs to dynamic label 30, a second label text 34 is required and control transfers to step 556. If no change occurs to dynamic label 30, the process remains in step 554.

In step 556, the center location for second label text 34 is determined. The process then proceeds to step 558.

In step 558, display of a second label text 34 is required. When dynamic label 30 changes state, the second label text 34 is to be placed at the same center location as the center location of the first label text 32. In other words, placement of second label text 34 is at the same location as first label text 32, i.e., second label text 34 is provided over the same over the area that first label text 32 occupied. Thus, dynamic label 30 need not be relocated and the changing of label texts 32, 34 occupies no more space on web page 21 than is necessary. Of course, if second label text 34 has significantly more characters than first label text 32, more space may be occupied. However, in such a case, the font size of second label text 34 may be reduced so that approximately the same area is needed for second label text 34 as was used by first label text 32. The process ends following step 558.

Figure 5C:
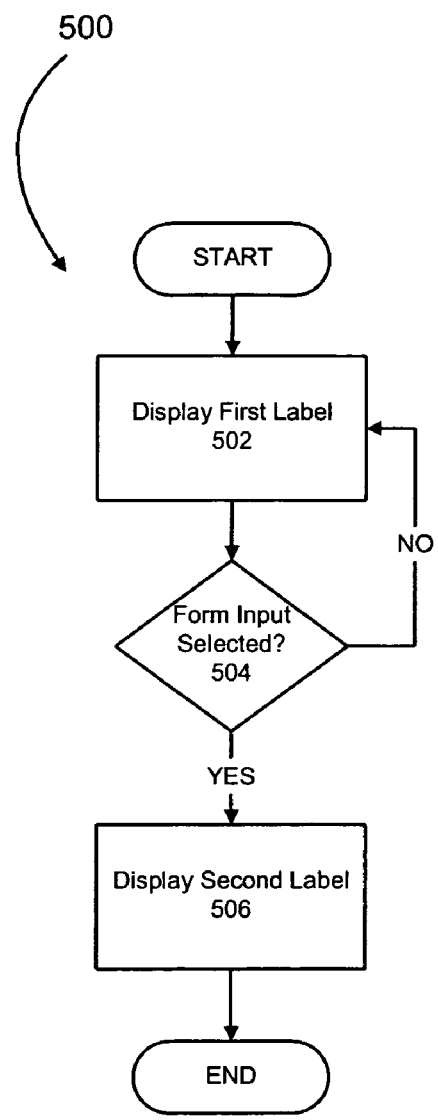
FIG. 5C is a simplified flow diagram illustrating the determination of label text for the dynamic label of the listing of FIGS. 2 and 3, according to an embodiment.

FIG. 5C is a simplified flow diagram illustrating the determination of label text 32 for dynamic label 30 of the listing of FIGS. 2 and 3 according to an embodiment. A description process flow 500 generally applies regardless of the underlying configuration that is being used. In step 502, first label text 32 is displayed for dynamic label 30. (See FIG. 2). Following step 502, control proceeds to step 504.

In step 504, the status of form input 28 is determined by client 18. In one embodiment, form input 28 is a "check box" that allows a user to select or unselect listing 22 by checking the box (illustrated in detail above with respect to FIGS. 2 and 3). However, the inputs for description process flow 500 may be derived from any input mechanism known to those skilled in the art. If form input 28 is unchecked as is illustrated in FIG. 2, then control proceeds to step 502. If form input 28 is checked, as is illustrated in FIG. 3, then control proceeds to step 506.

In step 506 a second label text 34 is displayed for a dynamic label 30. (See FIG. 3). In this case, because dynamic label 30 is in the second state, second label text 34 is displayed as "compare products." The process ends following step 506.

Figure 6:
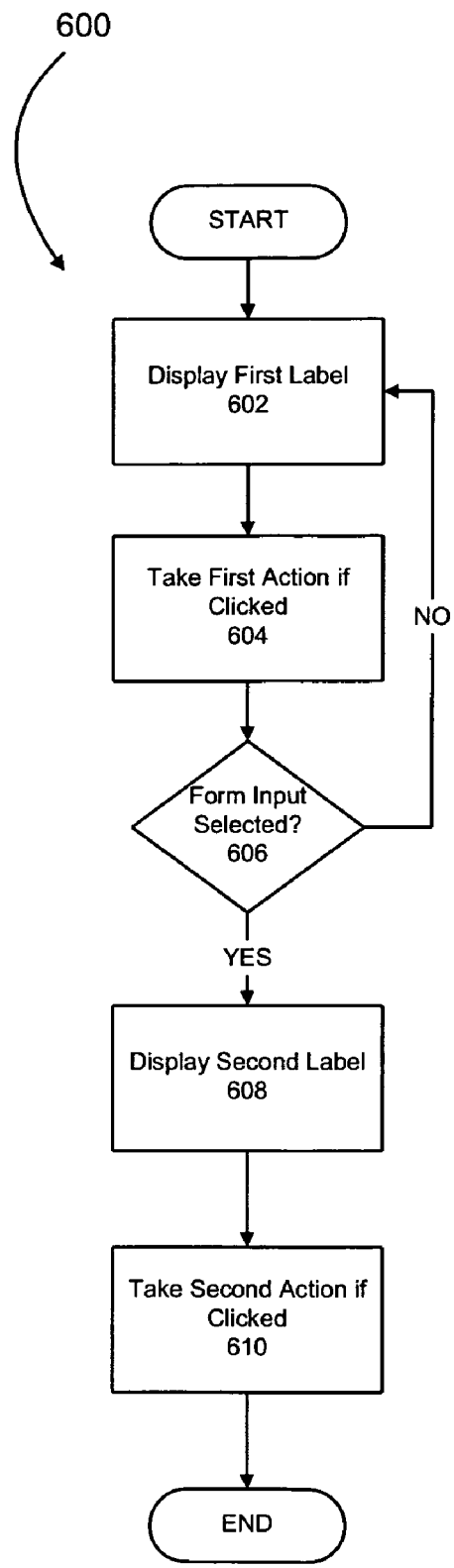
FIG. 6 is a simplified flow diagram illustrating the dynamic label further having actions associated with a label of the listing of FIGS. 2 and 3, according to an embodiment.

FIG. 6 is a simplified flow diagram illustrating dynamic label 30 of the listing of FIGS. 2 and 3 further having actions associated with a label. An action flow diagram 600 provides a process flow for how an action is taken when dynamic label 30 is clicked by a user. In step 602 first label text 32 is displayed for dynamic label 30. (See FIG. 2). Following Step 602, control proceeds to step 604.

In step 604, dynamic label 30 is prepared to trigger a first action if clicked. As illustrated in FIG. 2, when label text 32 is "check to compare," the action for dynamic label 30 is null. Therefore, there is no action taken when dynamic label 30 clicked in its first state. In alternative embodiments, an action may be assigned, such as "view details," as is illustrated in FIG. 4. Following Step 604, control proceeds to step 606.

In step 606, the status of form input 28 is determined by client 18. In one embodiment, form input 28 is a "check box" that allows a user to select or unselect listing 22 by checking the box (illustrated in detail above with respect to FIGS. 2 and 3). However, the inputs for action flow diagram 600 may be received from any input mechanism known to those skilled in the art for selection of a listing 22. If form input 28 is unchecked then control proceeds to step 602. If form input 28 is checked, then control proceeds to step 608.

In step 608 second label text 34 is displayed for dynamic label 30. (See FIG. 3). Following Step 608, control proceeds to step 610.

In step 610 dynamic label 30 is associated with listing 22' and a second action is taken if clicked (explained in detail above with respect to FIGS. 2 and 3, 5A). When second label text 34 is displayed, in this case, the action taken when clicked is to compare all listings 22 having checked form inputs 28 with each other. The process ends following step 610.

Figure 7:
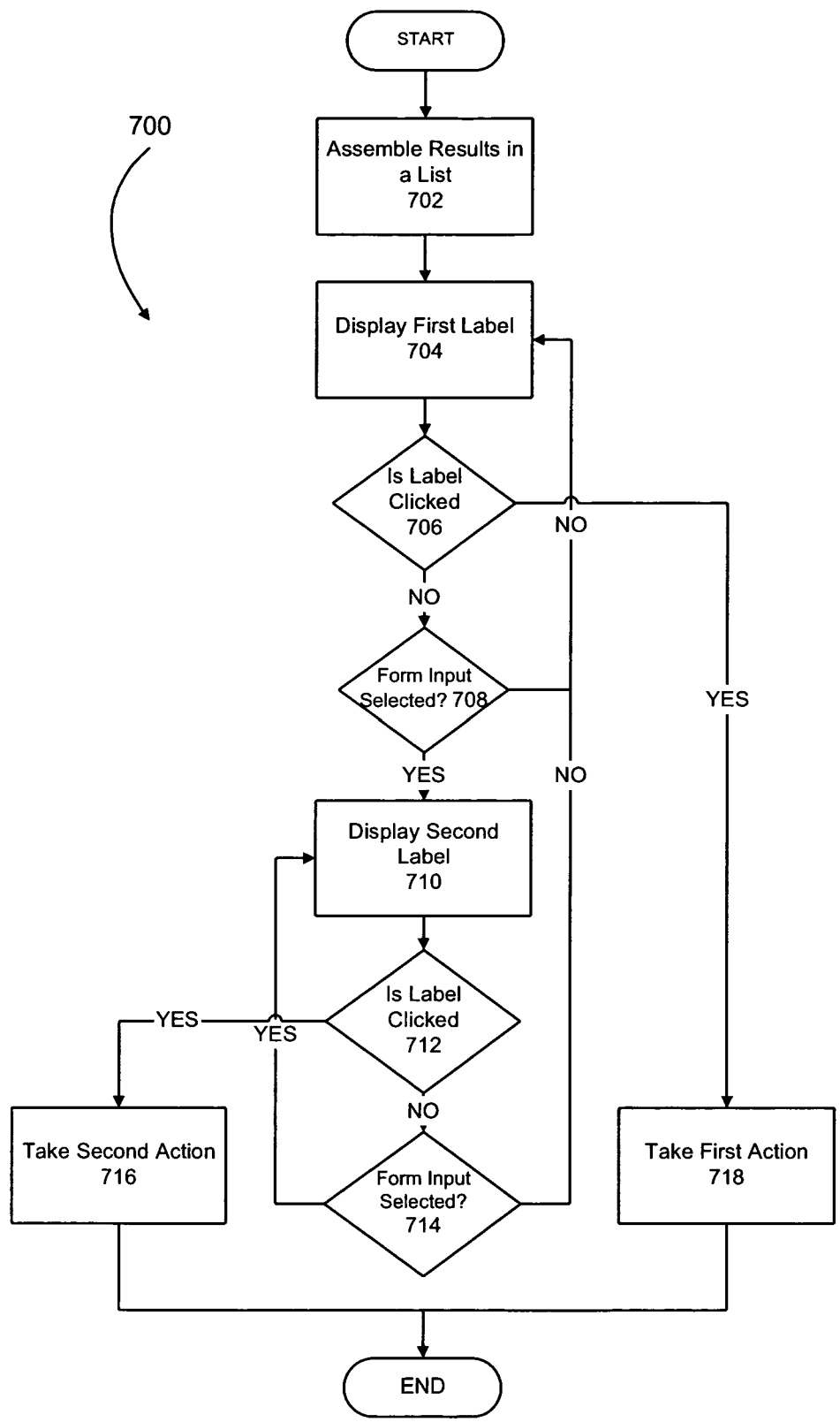
FIG. 7 is a flow diagram illustrating which label text to display and which action to take when a link is activated for the dynamic label of the listing of FIGS. 2 and 3, according to an embodiment.

FIG. 7 is a flow diagram illustrating which label text 32 to display and which action to take when a link is activated for dynamic label 30. A process flow 700 may be generally applied to embodiments customized for search results, auction systems, or online retailing. In step 702, a plurality of search result listings 22 are assembled into a list 20. (See FIG. 2). Following step 702, control proceeds to step 704.

In step 704 first label text 32 is displayed for dynamic label 30. (See FIG. 3). Following step 704, control proceeds to step 706.

In step 706, the action for dynamic label 30 while displaying first label text 32 is determined. If dynamic label 30 is clicked, then control proceeds to step 718 where a first action is taken. If dynamic label 30 is not clicked, then no action is taken and control proceeds to step 708. Alternatively, dynamic label 30 may not have an action associated with first label text 32 in which case the comparison will not transfer control to step 718 even if dynamic label 30 is clicked. In the case of such a null action, control bypasses step 706 and control falls through to step 708.

In step 708, the status of form input 28 is determined by client 18. In one embodiment, form input 28 is a "check box" that allows a user to select or unselect listing 22 by checking the box (illustrated in detail above with respect to FIGS. 2 and 3). However, the inputs for process flow 700 may be received from any input mechanism known to those skilled in the art for selection of a listing 22. If form input 28 is unchecked then control proceeds to step 704. If form input 28 is checked, then control proceeds to step 710.

In step 710, second label text 34 is displayed for dynamic label 30. (See FIG. 3). Following Step 710, control proceeds to step 712.

In step 712, the action for dynamic label 30 while displaying second label text 34 is determined. If dynamic label 30 is clicked, then control proceeds to step 716 where a second action is taken. If dynamic label 30 is not clicked, then no action is taken and control proceeds to step 714. Alternatively, dynamic label 30 may not have an action associated with second label text 34 in which case the comparison will not transfer control to step 716 even if dynamic label 30 is clicked. In the case of such a null action, control bypasses step 712 and control falls through to step 714.

In step 714, the status of form input 28 is again determined by client 18. If form input 28 is unchecked then control proceeds to step 704. If form input 28 is checked, then control proceeds to step 710.

In step 718, the first action is taken based on a user's "clicking" dynamic label 30 when first label text 32 is displayed. In alternative embodiments, an action may be assigned, such as "view details," as is illustrated in FIG. 4. Alternatively, no action could be assigned to the "clicking" of dynamic label 30. The process ends following step 716.

In step 716 the second action is taken based on a user's "clicking" dynamic label 30 when second label text 34 is displayed. In alternative embodiments, an action may be assigned, such as "view details," as is illustrated in FIG. 4. Alternatively, no action could be assigned to the "clicking" of dynamic label 30. The process ends following step 718.

Figure 8:
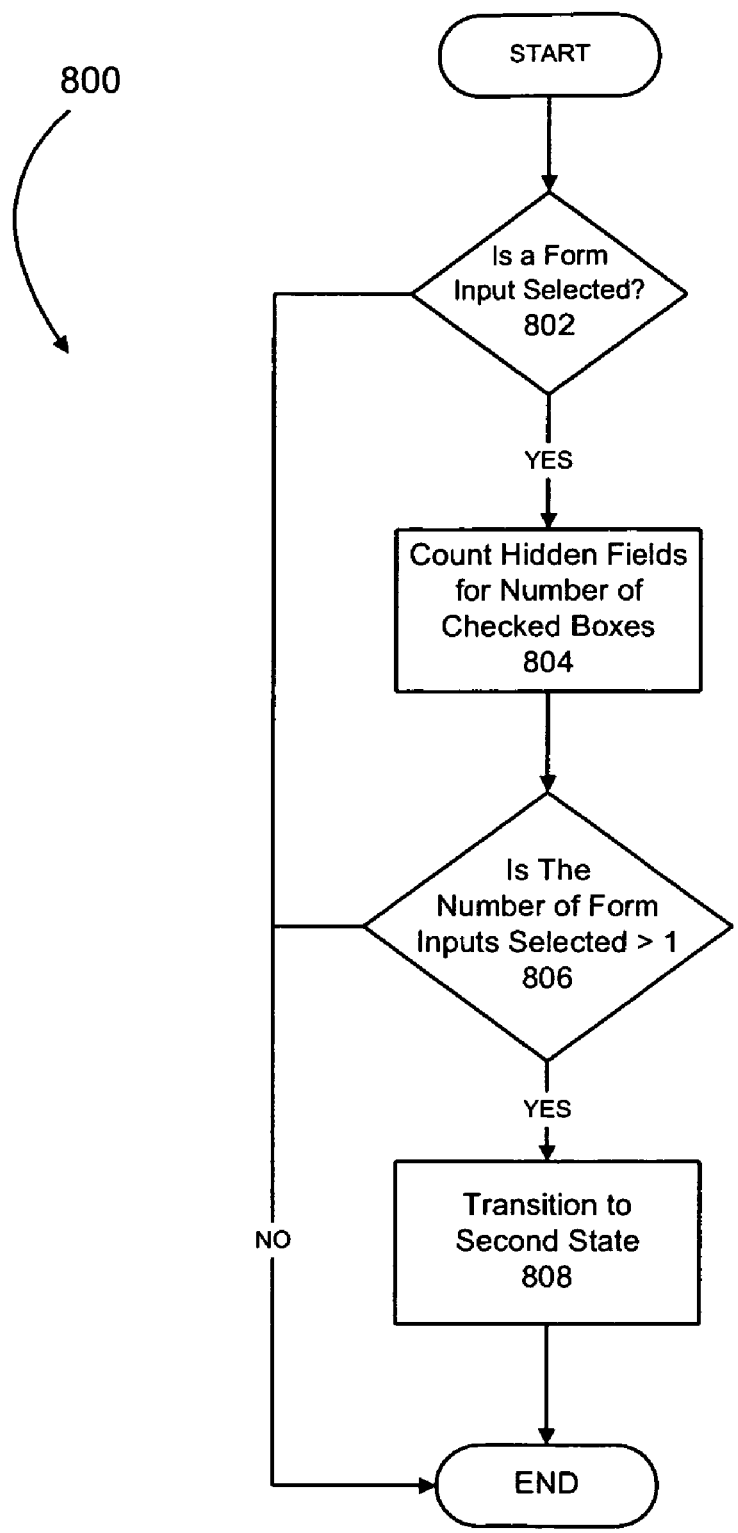
FIG. 8 is a flow diagram illustrating the determination to transition the dynamic labels of FIGS. 1-4, according to an embodiment.

FIG. 8 is a flow diagram illustrating a transition from a first state to a second state of dynamic label 30 of FIGS. 1-4. A transition process flow 800 may generally apply to embodiments of dynamic label 30. Typically, transition process flow 800 is executed when form input 28, such as a checkbox, is clicked. Prior to beginning transition process flow 800, it is required that dynamic label 30 be in a first state. Further, a system is required that supports the storage of each form input 28 in a countable form (for example, hidden fields in a page that are readable by a JavaScript function). In step 802, form input 28 is read to determine if the checkbox is selected. (See FIG. 2). If form input 28 is selected (checked) then control proceeds to 804. If form input 28 is not selected (unchecked) then the process ends.

In step 804 the process counts the number of selected form inputs 28. Form inputs 28 are typically check boxes having a value associated with a checked and unchecked state. (See FIGS. 1-4). The system then determines the status of the checked or unchecked form inputs 28 and tallies the number for each page. This tally is preferably stored with client 18. However, in one embodiment, server 12 may store the selection information, or both client 18 and server 12 may store the information. When multiple pages exist, the number of checked form inputs 28 is passed to the current page by sending the information in a "previous" or "next" link to the current page. Of course, in order to send the information the process must first count the number of selected form inputs and record any associated information, e.g., unique identifiers for each selected listing 22. Following step 804, control proceeds to step 806.

In step 806, the process determines whether a plurality of form inputs 28 is selected. If more than one form input 28 is selected, then a compare operation may occur. If only a single form input 28 is selected, a compare operation may not occur because, as should be understood, there must be at least two listings 22 in order to perform a comparison. If the number of form inputs 28 selected is greater than one, control proceeds to step 808. If the number of form inputs 28 selected is not greater than one, the process 800 ends following step 806.

In step 808, dynamic label 30 is transitioned to the second state represented by dynamic label 30. In this case, label text 34 is updated and a link activated. For example, when more than one form input 28 is selected, dynamic label 30 may change label text 32, 34 from a first state of "check to compare" to the second state of "compare products." (See FIG. 3). At the same time, a link associated with dynamic label 30 may become active such that following the link launches the compare operation. The process 800 ends following step 808.

In addition to the embodiments discussed herein, it is important to note that listings 22 may represent a mixture of comparable items. For example, a user may desire to compare coupons and reviews. Further, a comparison of user reviews and ratings may be desired. Further, dynamic label 30 may provide for the comparison of listings 22 and an aggregation of items outside the current pages. For example, a user may select listings 22 for comparison and use dynamic label 30 to compare the items with a saved aggregation of "favorites" or "wish list" items. Thus, the actions of dynamic label 30 are not limited to the current page or listings 22.

The preceding description has been presented only to illustrate and describe exemplary embodiments of the methods and systems of the claimed invention. It is not intended to be exhaustive or to limit the claimed invention to any precise form disclosed. It will be understood by those skilled in the art that various changes may be made and equivalents may be substituted for elements thereof without departing from the scope of the invention. In addition, many modifications may be made to adapt a particular system or method to the teachings herein without departing from the scope of the claimed invention. Further, it is anticipated and intended that future developments will occur in the field of information systems, and that the disclosed systems and methods will be incorporated into such future embodiments. Accordingly, it should be understood that the invention is capable of modification and variation and is limited only by the following claims. Therefore, it is intended that the claims appended hereto not be limited to particular embodiment disclosed herein, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A system comprising:
   a plurality of listings;
   a plurality of labels associated with at least some of said listings;
   a plurality of form inputs, each associated with one of said labels, wherein selection of a form input causes a transition of the associated label from a first state to a second state; and
   a link that is made active upon the transition, thereby associating an action with a label,
   wherein a first description is displayed in the first state and a second description is displayed in the second state, said first and second description having substantially the same location.

2. The system of claim 1, said link being configured to cause execution of said action upon selection of said link.

3. The system of claim 2, wherein a result of said action is selected from the group comprising: adding to a group, adding-to-cart, comparing, deleting, and excluding.

4. The system of claim 1, wherein said action is configured for electronic commerce.

5. The system of claim 1, wherein said selection of said link initiates a comparison operation on the listings that have their associated form inputs selected.

6. The system of claim 1, further comprising:
   a script for characterizing said plurality of form inputs to a plurality of predetermined categories.

7. The system of claim 1, wherein said second state is a comparison state and wherein said action compares the listings that have labels in said second state.

8. The system of claim 1, wherein said first and second description are centered in the substantially the same location.

9. The system of claim 1, wherein said form inputs are located substantially adjacent to said labels.

10. A method comprising:
providing by a computing device a plurality of listings on a page;
associating a plurality of labels with at least some of said listings;
associating a plurality of form inputs with one of said labels, wherein selection of a form input causes a transition of the associated label from a first state to a second state, wherein said first state displays a first description and said second state displays a second description; and
providing a link for at least one label, said link becoming enabled upon a transition of an associated label to said second state, wherein said first and second description are provided on the page with substantially the same location.

11. The method of claim 10, wherein said link provides a second page comparing those listings having labels in said second state.

12. The method of claim 10, wherein said link is configured to facilitate electronic commerce.

13. The method of claim 10, wherein said first and second description are centered in the substantially same location.

14. A system comprising:
a plurality of listings divided on at least two pages, wherein at least one of said pages is accessible by a first link;
a plurality of labels associated with at least some of said listings, each of said labels having a first state and a second state, wherein said first state displays a first description and said second state displays a second description, said first and second description having substantially the same location;
a plurality of form inputs associated with at least some of said labels, wherein selection of one of said form inputs transitions the associated label from said first state to said second state, said transition activating a second link; and
wherein selecting said second link provides an action page comprising at least some of said listings associated with said labels having form inputs that are selected.

15. The system of claim 14, wherein selecting said second link provides a plurality of action pages comprising at least some of said listings associated with said labels having form inputs that are selected.

16. The system of claim 15, wherein said plurality of action pages includes a comparison page.

17. The system of claim 14, wherein said second link performs a function selected from the group comprising: a null action, an add action, an add-to-cart action, a compare action, a delete action, and an exclude action.

18. The system of claim 14, wherein selecting said second link groups listings having labels in said second state in said action page.

19. The system of claim 14, wherein said second link is configured to facilitate electronic commerce.

20. The system of claim 14, wherein said first and second description are centered in the substantially same location.

* * * * *